United States Patent
Gallus et al.

(10) Patent No.: US 11,162,726 B2
(45) Date of Patent: Nov. 2, 2021

(54) LIQUID DETECTION SYSTEM

(71) Applicant: Johnson Controls Technology Company, Auburn Hills, MI (US)

(72) Inventors: Brian Thomas Gallus, York, PA (US); Curtis C. Crane, York, PA (US); Justin P. Kauffman, York, PA (US)

(73) Assignee: Johnson Controls Technology Company, Auburn Hills, MI (US)

( * ) Notice: Subject to any disclaimer, the term of this patent is extended or adjusted under 35 U.S.C. 154(b) by 473 days.

(21) Appl. No.: 16/088,790

(22) PCT Filed: Mar. 29, 2017

(86) PCT No.: PCT/US2017/024797
§ 371 (c)(1),
(2) Date: Sep. 26, 2018

(87) PCT Pub. No.: WO2017/172950
PCT Pub. Date: Oct. 5, 2017

(65) Prior Publication Data
US 2020/0300524 A1 Sep. 24, 2020

Related U.S. Application Data

(60) Provisional application No. 62/315,548, filed on Mar. 30, 2016.

(51) Int. Cl.
*F25B 49/02* (2006.01)
*G01F 1/684* (2006.01)

(52) U.S. Cl.
CPC ............ *F25B 49/022* (2013.01); *G01F 1/684* (2013.01); *F25B 2500/14* (2013.01)

(58) Field of Classification Search
CPC ................ F25B 49/022; F25B 2500/14; F25B 2500/28; G01F 1/684; G01F 1/74; G01F 1/68
See application file for complete search history.

(56) References Cited

U.S. PATENT DOCUMENTS 3,846,730 A * 11/1974 Hamilton ............. G01N 27/121
338/34
4,506,518 A * 3/1985 Yoshikawa ........... F16K 37/005
62/180
(Continued)

FOREIGN PATENT DOCUMENTS

CN 103743111 A 4/2014
CN 104070960 A 10/2014
(Continued)

OTHER PUBLICATIONS

Chinese Office Action for CN Application No. 201780021551.8 dated Jun. 29, 2020, 12 pgs.
(Continued)

*Primary Examiner* — Emmanuel E Duke
(74) *Attorney, Agent, or Firm* — Fletcher Yoder, P.C.

(57) ABSTRACT

The present disclosure relates to a sensor disposed in a conduit on a suction side of a compressor, wherein the conduit is configured to convey a fluid and a controller communicatively coupled to the sensor. The controller includes a processor and a memory, the memory is configured to store instructions to be performed by the processor, and the controller is configured to receive one or more indications from the sensor of an amount of power consumed by an active sensor component, determine a presence of liquid in the fluid based at least on the one or more indications, and control a device based on the presence of liquid in the fluid.

19 Claims, 4 Drawing Sheets

(56) References Cited

U.S. PATENT DOCUMENTS

| | | | | |
|---|---|---|---|---|
| 4,589,060 | A | * | 5/1986 | Zinsmeyer ......... G05D 23/1912 700/28 |
| 5,495,720 | A | | 3/1996 | Buck |
| 5,632,154 | A | * | 5/1997 | Sibik ....................... F25B 41/31 62/99 |
| 5,691,466 | A | * | 11/1997 | Lawrence ............... G01N 27/18 374/148 |
| 6,139,280 | A | * | 10/2000 | Holt ...................... F04C 28/125 184/6.1 |
| 6,340,243 | B1 | * | 1/2002 | Deane ..................... G01F 1/002 374/24 |
| 8,677,999 | B2 | | 3/2014 | Allum et al. |
| 9,157,227 | B2 | | 10/2015 | Savaria |
| 2013/0291568 | A1 | * | 11/2013 | Elstroem ................ F25B 41/31 62/56 |
| 2014/0000359 | A1 | | 1/2014 | Kurz et al. |
| 2015/0241344 | A1 | * | 8/2015 | Mattejat ............... G01N 21/534 73/19.1 |

FOREIGN PATENT DOCUMENTS

| | | | |
|---|---|---|---|
| CN | 105065092 | A | 11/2015 |
| CN | 105431721 | A | 3/2016 |
| EP | 2796208 | A1 | 10/2014 |
| GB | 2157447 | A * | 10/1985 ............. G01K 1/143 |
| GB | 2302725 | A | 1/1997 |
| JP | 2007086035 | A | 4/2007 |
| WO | 2008078379 | A1 | 7/2008 |
| WO | 2012062329 | A1 | 5/2012 |

OTHER PUBLICATIONS

Zhou Qing et al, "Principle and Application of Practical Flow Meter", National Defense Industry Press, Jan. 31, 2008, 13 pgs.

Xue Ma, "Design and Experimental Investigation on Solar Refrigeration Oil Cycle", Engineering and Technology II, No. 3 of China Master's Theses Full-text Database, Mar. 15, 2016, 65 pgs.

Chinese Office Action for CN Application No. 201780021551.8 dated Oct. 26, 2020, 5 pgs.

International Search Report and Written Opinion for PCT Application No. PCT/US2017/024797 dated Jun. 26, 2017, 16 pgs.

Chinese Notice of Allowance for CN Application No. 201780021551. 8, dated Feb. 3, 2021, 3 pgs.

* cited by examiner

LIQUID DETECTION SYSTEM

CROSS REFERENCE TO RELATED APPLICATIONS

This application is a National Stage of PCT Application No. PCT/US17/24797, entitled "LIQUID DETECTION SYSTEM," filed on Mar. 29, 2017, which claims priority to U.S. Provisional Application No. 62/315,548, entitled "LIQUID DETECTION SYSTEM," filed on Mar. 30, 2016, the disclosures of which are hereby incorporated by reference in their entireties for all purposes.

BACKGROUND

The present disclosure relates generally to a liquid detection system. Specifically, the present disclosure relates to a liquid detection system for a refrigeration system.

Refrigerants are used to transfer heat between fluids and may be employed in a variety of applications, such as heating, ventilating, air conditioning, and refrigeration (HVAC&R) systems, heat pumps, or power generation in Organic Rankine Cycles (ORC). The refrigerant is typically transported within a refrigerant piping system, which includes pipes, pipe fittings, valves, and the like. The refrigerant piping system transports the refrigerant between various vessels and equipment within the HVAC&R system, such as compressors, turbines, pumps, evaporators, condensers, and the like. The refrigerant may undergo one or more phase changes within the refrigerant piping system, and thus, liquid refrigerant and vaporous refrigerant may be present in the HVAC&R system simultaneously (e.g., either in the same location or in different locations). In some cases, it may be desirable for the refrigerant to be substantially saturated (e.g., substantially all liquid or substantially all vapor) at certain locations in the system.

DRAWINGS

DETAILED DESCRIPTION

Figure 1:
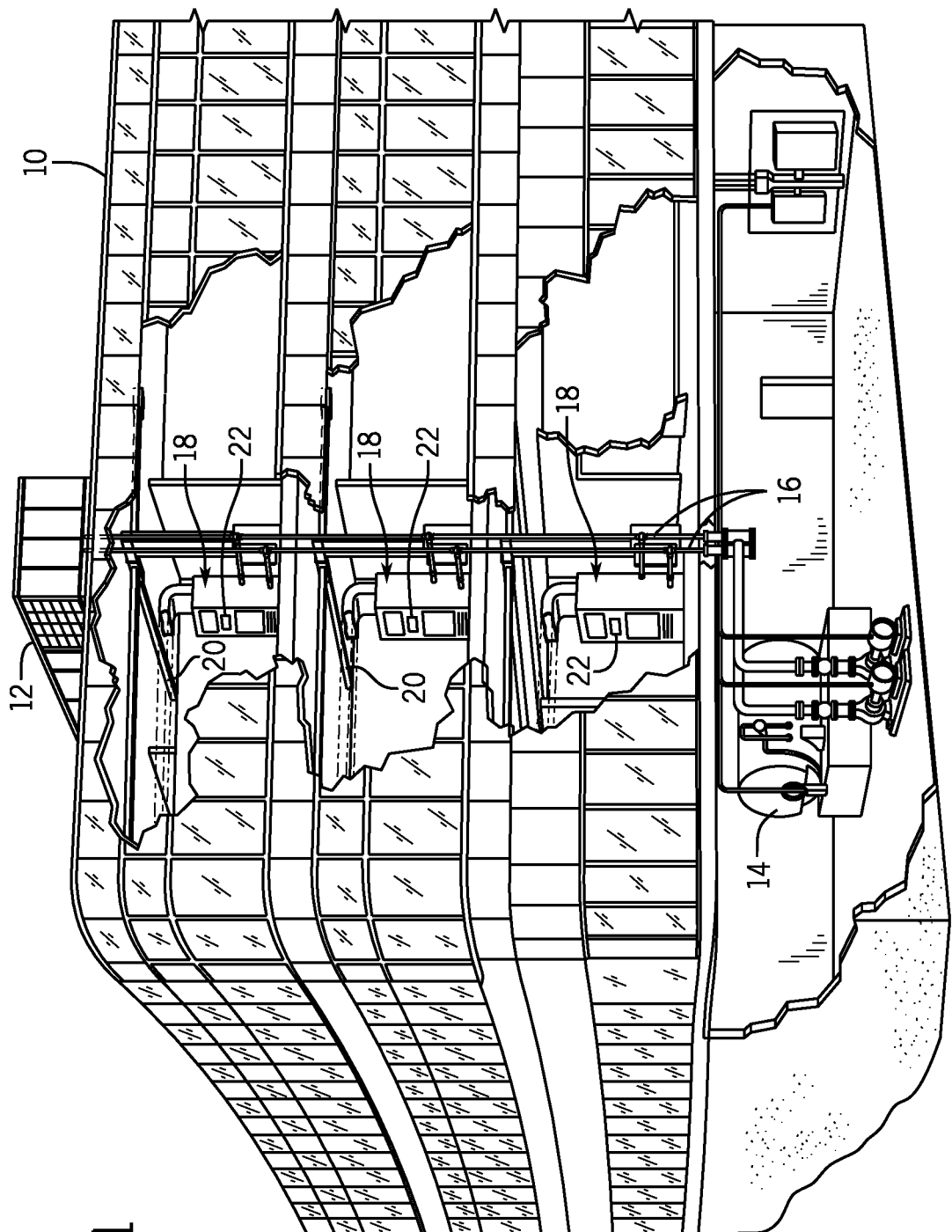
FIG. 1 is perspective view of a commercial or industrial environment that employs a refrigeration system, in accordance with an aspect of the present disclosure.

The present disclosure is directed to an improved liquid detection system that may be configured to determine a presence of liquid in a conduit (e.g., a quantitative value or a qualitative indication of the presence of liquid), such that operating parameters of a process may be adjusted based on the detected liquid. In certain applications, it may not be desirable for liquid to be present in certain locations of a system that include a vaporous working fluid. Thus, detecting liquid (e.g., a quantitative value or a qualitative indication of the presence of liquid) in such locations of the system may enable an operator and/or a control system to adjust one or more operating parameters to reduce the presence of liquid at a given location. As a non-limiting example, refrigeration systems may include a cycle that causes a refrigerant to undergo one or more phase changes (e.g., from liquid to gas and/or from gas to liquid). Some components of a refrigeration system (e.g., a compressor) may operate with a higher efficiency (e.g., at a higher capacity) when the refrigerant is in a substantially saturated phase (e.g., at least 99% liquid or at least 99% vapor). Therefore, it may be desirable to detect the presence of liquid in conduits that may be designed to carry substantially saturated vapor.

For example, a refrigeration system may include a vapor compression refrigeration cycle (e.g., a chiller). Traditionally, a vapor compression refrigeration cycle (e.g., a chiller) may include a compressor that circulates refrigerant through the cycle, an evaporator to vaporize (e.g., transfer heat toward) the refrigerant prior to entering the compressor, a condenser to liquefy (e.g., condense and/or transfer heat away from) the refrigerant upon exiting the compressor, and/or an expansion valve to further cool the refrigerant before entering the evaporator. Because liquids are generally incompressible, it may be desirable for the refrigerant to be substantially saturated vapor when the refrigerant enters the compressor. For example, liquid that enters the compressor through a suction side of the compressor may cause components to wear (e.g., erode), wash oil away from bearings in the compressor, and/or add load to the compressor, thereby causing the system and/or the compressor to operate at a reduced efficiency.

Traditionally, baffles and/or mesh screens may be positioned in a vessel or a conduit to block liquid from entering into the compressor. However, baffles and/or mesh screens may still allow liquid to reach the compressor when operating the system at high capacities (e.g., increased flow rates through the components of the system). Operating a vapor compression refrigeration cycle at relatively high capacities may increase a risk of introducing liquid into the compressor because an evaporator may not be sized to manage the refrigerant at high flow rates (e.g., the evaporator spaces may not be sized to maintain proper velocities of the refrigerant, such that liquid may remain in the vapor stream). Traditional systems may measure a temperature and a pressure of refrigerant entering and/or exiting the compressor to determine a phase composition (e.g., an amount of liquid and/or vapor) of the refrigerant. For example, a temperature and a pressure measurement may be utilized to determine a phase composition of the refrigerant utilizing a phase diagram. However, such measurements and calculations may be inaccurate as a result of engineering tolerances (e.g., transition time) associated with temperature sensors and/or pressure sensors. Accordingly, it is now recognized that utilizing a thermal flow sensor to determine a presence of liquid in predetermined locations of a system is desired. In accordance with embodiments of the present disclosure, operating parameters of the system may be adjusted to reduce a presence of liquid at the predetermined location based on the liquid detected by the thermal flow sensor (e.g., a quantitative value of the liquid present or a qualitative indication of the presence of liquid).

Turning now to the figures, FIG. 1 depicts an application for a refrigeration system. Such systems, in general, may be applied in a range of settings, both within the heating, ventilating, air conditioning, and refrigeration (HVAC&R) field and outside of that field. The refrigeration systems may provide cooling to data centers, electrical devices, freezers, coolers, or other environments through vapor-compression refrigeration, absorption refrigeration, and/or thermoelectric cooling. In presently contemplated applications, however, refrigeration systems may also be used in residential, commercial, light industrial, industrial, and in any other application for heating or cooling a volume or enclosure, such as a residence, building, structure, and so forth. Moreover, the refrigeration systems may be used in industrial applications, where appropriate, for basic refrigeration and heating of various fluids.

FIG. 1 illustrates one application, in this case a heating, ventilating, air conditioning, and refrigeration system (HVAC&R) for building environmental management that may employ one or more heat exchangers. For example, a building 10 is cooled by a system that includes a refrigeration system 12 and a boiler 14. As shown, the refrigeration system 12 is disposed on the roof of the building 10 and the boiler 14 is located in the basement; however, the refrigeration system 12 and the boiler 14 may be located in other equipment rooms or areas of the building 10. The refrigeration system 12 is an air cooled device and/or a mechanical cooling system (e.g., a vapor compression refrigeration cycle or chiller) that implements a refrigeration cycle to cool water (or another cooling fluid, such as glycol). The refrigeration system 12 is housed within a single structure that may include a mechanical cooling circuit, a free cooling system, and associated equipment such as pumps, valves, and piping. For example, the refrigeration system 12 may be single package rooftop unit that incorporates a free cooling system and a mechanical cooling system. The boiler 14 is a closed vessel that includes a furnace to heat water. The water (or another cooling fluid) from the refrigeration system 12 and the boiler 14 is circulated through the building 10 by water conduits 16. The water conduits 16 are routed to air handlers 18, located on individual floors and within sections of building 10.

The air handlers 18 are coupled to ductwork 20 that is adapted to distribute air between the air handlers 18 and may receive air from an outside intake (not shown). The air handlers 18 include heat exchangers that circulate cold water from the refrigeration system 12 and hot water from the boiler 14 to provide heated or cooled air. Fans, within the air handlers 18, draw air across coils of the heat exchangers and direct the conditioned air to environments within the building 10, such as rooms, apartments, or offices, to maintain the environments at a designated temperature. A control device, shown here as including a thermostat 22, may be used to designate the temperature of the conditioned air. The control device 22 may also be used to control the flow of air through and from the air handlers 18. Other devices may, of course, be included in the system, such as control valves that regulate the flow of water and pressure and/or temperature transducers or switches that sense the temperatures and pressures of the water, the air, and so forth. Moreover, the control devices may include computer systems that are integrated with and/or separate from other building control or monitoring systems, including systems that are remote from the building 10. It should be noted that while water is discussed as a cooling fluid, any suitable cooling fluid may be utilized in the refrigeration system 12.

Figure 2:
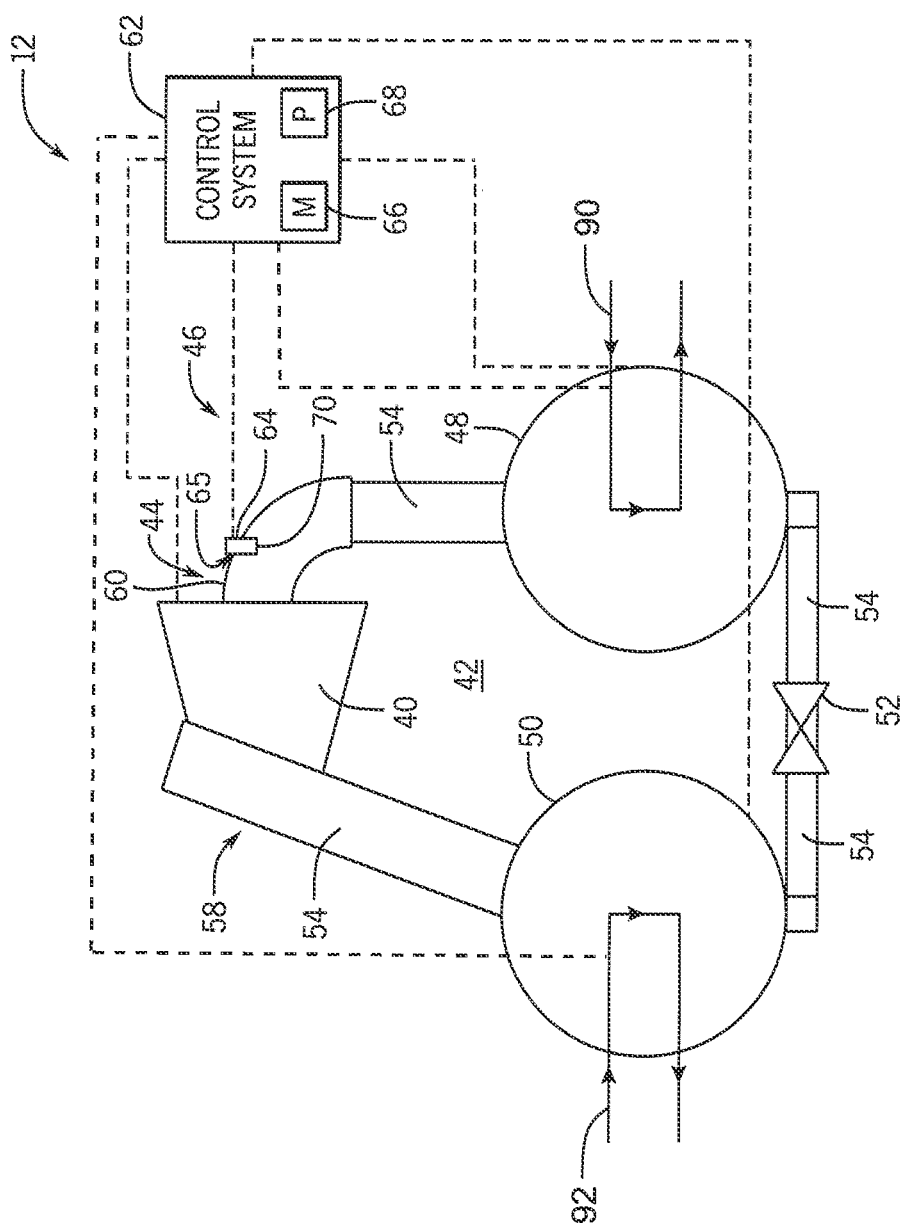
FIG. 2 is a schematic of an embodiment of a refrigeration system that includes a liquid detection system, in accordance with an aspect of the present disclosure.

As discussed above, it may be desirable to detect a presence of liquid at predetermined locations of a system, such as the refrigeration system 12 (e.g., a chiller). Some components of the refrigeration system 12 may operate at reduced efficiency when liquid is present in a stream of fluid that enters such components. For example, a compressor 40 of a vapor compression refrigeration cycle 42 (e.g., at least a portion of the refrigeration system 12) may operate at a reduced efficiency when liquid droplets are present within a suction side 44 of the compressor 40, as shown in FIG. 2. FIG. 2 is a schematic of the vapor compression refrigeration 42 that includes an improved liquid detection system 46. While the present discussion focuses on utilizing the liquid detection system 46 in refrigeration systems, it should be noted that the liquid detection system 46 may be utilized in any system where detection of liquid at a predetermined location is desired.

As shown in the illustrated embodiment of FIG. 2, the vapor compression refrigeration cycle 42 includes the compressor 40, an evaporator 48, a condenser 50, and/or an expansion valve 52. Refrigerant 54 may flow through the vapor compression refrigeration cycle 42 and undergo one or more phase transitions (e.g., from vapor to liquid or vice versa). For example, substantially vaporous refrigerant 54 (e.g., at least 90% of the refrigerant 54 is in the vapor phase) from the compressor 40 may be cooled and condensed into substantially liquid refrigerant 54 (e.g., at least 90% of the refrigerant 54 is in the liquid phase) in the condenser 50. In certain embodiments, the condenser 50 may be configured to transfer heat away from the refrigerant 54 and toward a cooling fluid 92 (e.g., a heat transfer fluid, water and/or air). Accordingly, a temperature of the refrigerant 54 may decrease, thereby causing at least a portion of the refrigerant 54 to transition from the vapor phase to the liquid phase. The substantially liquid refrigerant 54 may be further cooled in the expansion valve 52. For example, a pressure of the refrigerant 54 flowing through the expansion valve 52 may rapidly decrease as a result of a pressure drop through the expansion valve 52. As the pressure of the refrigerant 54 decreases, the temperature of the refrigerant 54 may also decrease. Accordingly, substantially liquid refrigerant 54 may flow toward the evaporator 48.

The refrigerant 54 may be substantially vaporized (e.g., at least 90% of the refrigerant 54 is in the vapor phase) in the evaporator 48. In certain embodiments, heat may be transferred to the refrigerant 54 (e.g., from a heat transfer medium 90 or heat transfer fluid) in the evaporator 48, thereby causing the refrigerant 54 to transition from a liquid phase to the vapor phase. The substantially vaporized refrigerant 54 may flow towards the suction side 44 (e.g., a low pressure side) of the compressor 40 from the evaporator 48. The compressor 40 may increase a pressure of the substantially vaporized refrigerant 54, which in some cases, may cause a temperature of the substantially vaporized refrigerant 54 to increase. The substantially vaporized refrigerant 54 may exit the compressor 40 on a discharge side 58 (e.g., a high pressure side) and be directed toward the condenser 50 where the cycle may continue (e.g., repeat). As discussed above, liquid present in the suction side 44 of the compressor 40 may reduce an operating efficiency of the compressor 40. Accordingly, the liquid detection system 46 may be disposed in a conduit 60 on the suction side 44 of the compressor 40, such that an operator and/or a control system 62 may detect a presence of liquid entering the compressor 40.

In certain embodiments, the liquid detection system 46 may include a sensor 64 and the control system 62. For example, the sensor 64 may be disposed within the conduit 60 and configured to contact the refrigerant 54 flowing from the evaporator 48 and toward the compressor 40. In some embodiments, the sensor 64 may extend between approximately 0.1 inches and 1.5 inches, between approximately 0.5 inches and 1.4 inches, or between approximately 0.75 inches and 1.25 inches into the conduit 60. In other embodiments, the sensor 64 may extend any suitable distance into the conduit 60, such that the sensor 64 contacts the refrigerant 54 flowing through the conduit 60. In some embodiments, the sensor 64 may be disposed in the conduit 60 via an opening 65. The opening 65 may include a threaded fitting such that the sensor 64 may be fastened to the opening 65, thereby blocking the refrigerant 54 from leaking out of the conduit 60 through the opening 65. In other embodiments, the sensor 64 may be disposed in the conduit 60 using any suitable technique that enables the sensor 64 to contact the refrigerant 54 flowing through the conduit 60 and to block the refrigerant 54 from inadvertently exiting the conduit 60.

The sensor 64 may send one or more signals to the control system 62, which may adjust one or more operating parameters of the vapor compression refrigeration cycle 42 to reduce a presence of liquid in the conduit 60. The control system 62 may include memory circuitry 66 (e.g., memory) and a processor 68. For example, the control system 62 may include non-transitory code or instructions stored in a machine-readable medium (e.g., the memory 66) that is used by a processor (e.g., the processor 68) to implement the techniques disclosed herein. The memory 66 may store computer instructions that may be executed by the processor 68. Additionally, the memory 66 may store experimental data and/or other values (e.g., threshold values) relating to operating conditions of the vapor compression refrigeration cycle 42.

In accordance with embodiments of the present disclosure, the sensor 64 may include a thermal flow sensor. Thermal flow sensors are traditionally utilized to determine a flow rate of fluid through a conduit. Thermal flow sensors may include a temperature sensor and/or a tip portion 70 (e.g., a distal end) that includes a heating element configured to sense changes in a heat transfer coefficient of fluid within a conduit. For example, power may be consumed by the tip portion 70 (e.g., the heating element), such that the heating element reaches a predetermined temperature (e.g., a set point). The thermal flow sensor may monitor an amount of power consumed by the heating element to maintain the temperature at the predetermined temperature (e.g., via an internal voltage meter or another suitable device). Thus, as flow changes in the conduit 60, the amount of power consumed by the heating element may also change (e.g., as flow increases, more power may be consumed, and as flow decreases, less power may be consumed), thereby enabling the thermal flow sensor (or a control device) to determine the flow rate of fluid within the conduit 60. In other words, the amount of power consumed by the heating element (of the tip portion 70) may be indicative of the flow rate of fluid through the conduit 60. In other embodiments, the sensor 64 may determine a difference in temperature between a location near the heating element and a location remote from the heating element in the tip portion 70. As heat transfer to the fluid increases, the sensor 64 may detect a temperature differential proportional to the flow rate of fluid through the conduit 60.

Moreover, it is now recognized that thermal flow sensors may be utilized to detect liquid and/or measure an amount of liquid present in a conduit (e.g., conduit 60) of a potential two-phase refrigerant. For example, the tip portion 70 (e.g., the heating element) of the thermal flow sensor may incur a large power demand (and thus consumes more power) and/or an internal temperature differential in the tip portion 70 may increase when liquid refrigerant 54 contacts the sensor 64 because liquid cools the heating element more than vapor (e.g., a latent heat capacity for converting saturated liquid refrigerant 54 to vapor is substantially greater than a sensible heat capacity of the vaporous refrigerant). Accordingly, the sensor 64 may send one or more indications to the control system 62 related to an amount of power consumed by the tip portion 70 (e.g., the heating element) of the sensor 64 (e.g., determined by an internal voltage meter or another suitable device) or a temperature differential in the tip portion 70. Accordingly, the control system 62 may detect a presence of liquid in the conduit 60 (or the fluid) based at least on the amount of power consumed by the tip portion 70 (e.g., the heating element) and/or the internal temperature differential in the tip portion 70 (e.g., a location near the heat element versus a location remote from the heating element along the tip portion) received as proportional outputs from the sensor 64. Accordingly, the control system 62 may adjust operating parameters of the vapor compression refrigeration cycle 42 in response to the detection of liquid in the conduit 60 (or fluid).

For example, the control system 62 may be configured to send a signal to the evaporator 48 to adjust an amount of heat transfer medium 90 (e.g., heat transfer fluid) supplied to the evaporator 48 based on the presence of liquid in the conduit 60. In certain embodiments, when the sensor 64 detects a presence of liquid above a threshold (e.g., a threshold value or a predetermined sensor response stored in the memory 66 of the control system 62), the control system 62 may send a signal to the evaporator 48 to increase a flow of the heat transfer medium 90, thereby increasing an amount of vaporization in the evaporator 48 (e.g., increasing heat transfer). In other embodiments, the control system 62 may send a signal to the evaporator 48 when the control system 62 receives a predetermined response from the thermal flow sensor 64 (e.g., significant power fluctuations or spikes). Additionally, the control system 62 may send a signal to the condenser 50 to decrease a flow of cooling fluid 92 (e.g., a flow of heat transfer fluid) to the condenser 50, such that a temperature of the refrigerant 54 exiting the condenser 50 is increased. The control system 62 may also send a signal to the compressor 40 to decrease a speed of the compressor 40 (e.g., adjust an amount of power supplied to a prime mover of the compressor 40), thereby decreasing a flow rate of the refrigerant 54 through the vapor compression refrigeration cycle 42. In still further embodiments, the control system 62 may be configured to send a signal to the expansion device 52 to adjust a flow rate of the refrigerant 54 through the expansion device 52. For example, when the presence of liquid in the conduit 60 exceeds the threshold, the control system 62 may reduce the flow rate of the refrigerant 54 through the expansion device 52, thereby reducing a volume of the refrigerant 54 in the evaporator 48.

Figure 3:
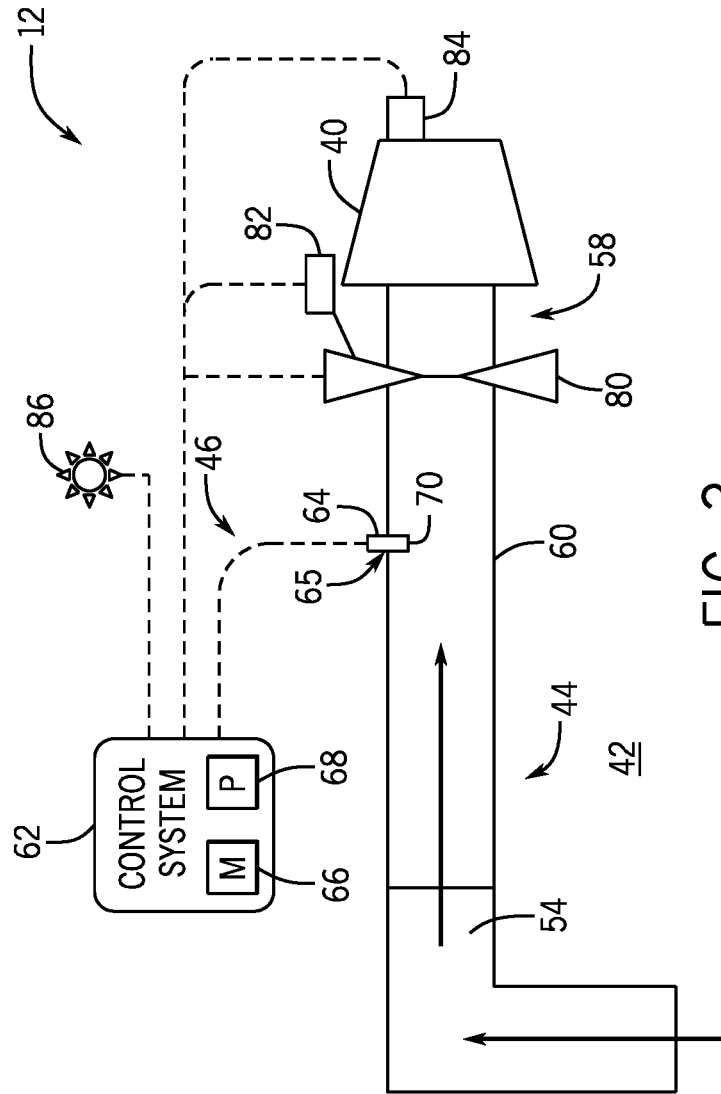
FIG. 3 is an expanded view of the refrigeration system of FIG. 2 that includes the liquid detection system and a capacity control device, in accordance with an aspect of the present disclosure.

In some embodiments, the suction side 44 of the compressor 40 may include additional components, as shown in FIG. 3. For example, FIG. 3 is an expanded schematic of the suction side 44 of the vapor compression refrigeration cycle 42 of FIG. 2. As shown in the illustrated embodiment of FIG. 3, the suction side 44 may include a capacity control device 80 (e.g., an inlet guide vane) located upstream of the compressor 40. However, in other embodiments, the capacity control device 80 may be downstream of the compressor 40. The capacity control device 80 may include an actuator 82 that adjusts a position of the capacity control device 80 (e.g., inlet guide vanes) to control an amount of refrigerant 54 that flows through the compressor 40. In some embodiments, the capacity control device 80 and/or the actuator 82 may be coupled to the control system 62. Accordingly, when the sensor 64 sends a signal to the control system 62 related to a presence of liquid in the conduit 60, the control system 62 may send a resultant signal to the capacity control device 80 and/or the actuator 82. For example, when the sensor 64 detects a presence of liquid in the conduit 60 above a threshold (e.g., a quantitative value or a predetermined response of the sensor 64), the control system 62 may direct the capacity control device 80 to limit a flow of the refrigerant 54 toward the compressor 40 (e.g., instruct the capacity control device 80 to close). Accordingly, the flow rate of the refrigerant 54 through the vapor compression refrigeration cycle 42 may decrease, which may ultimately lead to a reduction in liquid in the conduit 60 (e.g., the velocity of the refrigerant through the evaporator 48 is below a threshold velocity, thereby blocking liquid entrainment in the vaporous refrigerant 54).

Additionally, the compressor 40 may be coupled to the control system 62. For example, the compressor 40 may include a prime mover 84 (e.g., a motor) configured to adjust a speed of the compressor 40, and thus, a pressure of the refrigerant 54 on the discharge side 58 of the compressor 40. In some embodiments, the control system 62 may send one or more signals to the prime mover 84 to adjust a speed of the compressor 40 based on a presence of liquid in the conduit 60. For example, when the presence of liquid in the conduit 60 exceeds the threshold (e.g., a threshold value and/or a predetermined response from the sensor 64), the control system 62 may instruct the prime mover 84 to decrease a speed of the compressor 40, thereby reducing a flow rate of the refrigerant 54 through the vapor compression refrigeration cycle 42. Accordingly, the presence of liquid in the conduit 60 may be reduced because a velocity of the refrigerant 54 through the evaporator 48 is below a threshold velocity, thereby blocking liquid entrainment in the vaporous refrigerant 54. Adjustments to the speed of the compressor 40 (e.g., via the prime mover 84) may be made simultaneously with, or in lieu of, adjustments made to the capacity control device 80.

In certain embodiments, the control system 62 may be coupled to an indicator 86 (e.g., a display, a light emitting diode (LED), a light bulb, a speaker, or another suitable indicator) that alerts an operator when the liquid in the conduit 60 exceeds a threshold. In response, the operator may take action to adjust one or more operating parameters of the vapor compression refrigeration cycle 42 to reduce the presence of liquid in the conduit 60. For example, the vapor compression refrigeration cycle 42 may include one or more valves and/or controls that may be manually adjusted (e.g., the one or more valves and/or controls may also be adjusted by the control system 62). Accordingly, the operator may manually adjust operating parameters of the vapor compression refrigeration cycle 42 when the indicator 86 notifies the operator that the liquid present in the conduit 60 exceeds the threshold.

Figure 4:
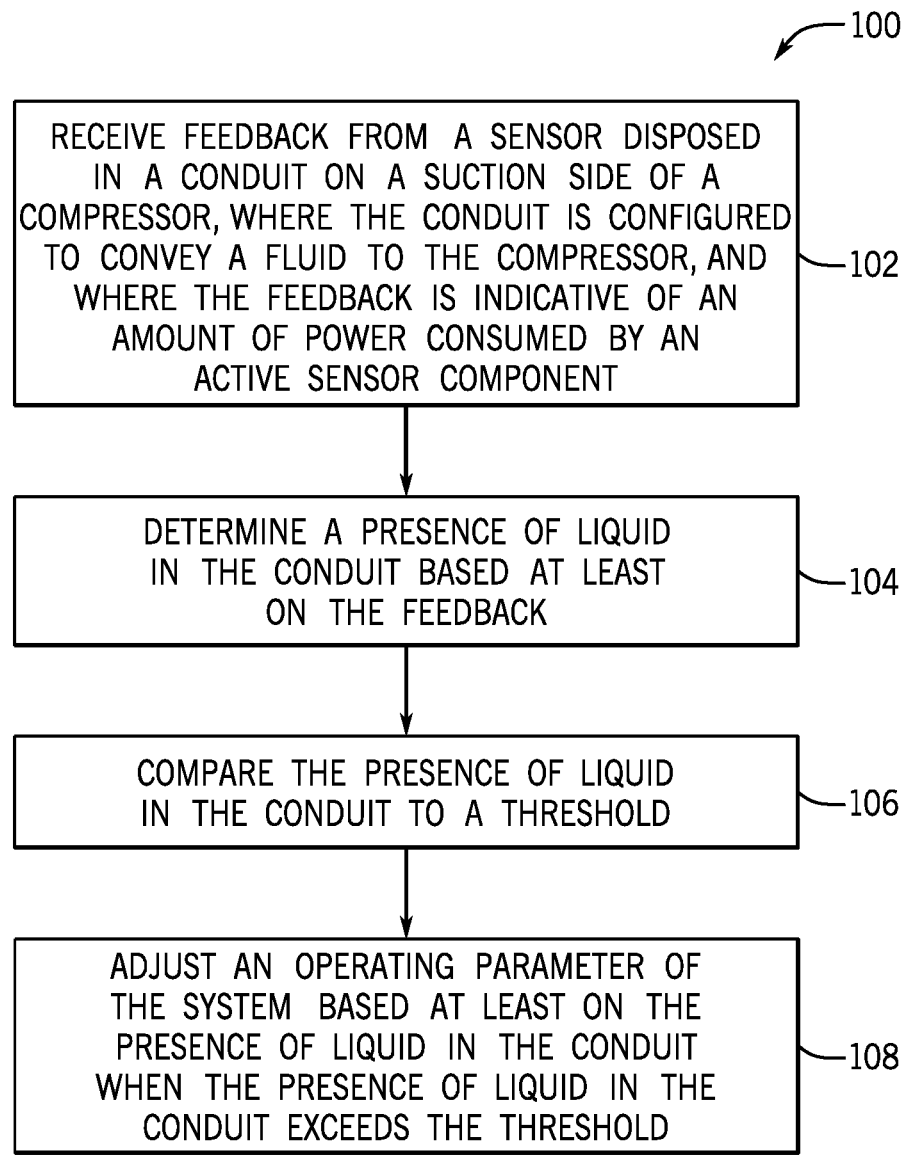
FIG. 4 is a block diagram of a process that may be utilized to detect the presence of a liquid in the refrigeration system of FIGS. 2 and 3, in accordance with an aspect of the present disclosure.

In any case, the control system 62 may be configured to determine a presence of liquid in the conduit 60 and/or adjust one or more operating parameters to reduce the presence of liquid in the conduit 60 based on the detection of liquid in the conduit 60. For example, FIG. 4 is a block diagram of a process 100 that may be utilized to adjust (e.g., reduce) the presence of liquid in the conduit 60. At block 102, the control system 62 may receive one or more indications from the sensor 64. As discussed above, the sensor 64 may be disposed in the conduit 60 on the suction side 44 of the compressor 40, which is configured to convey the refrigerant 54 in a substantially vaporous phase (e.g., at least 90% vapor). Accordingly, it is now recognized that it may be desirable to detect the presence of liquid in the conduit 60 and adjust one or more operating parameters to reduce the presence of liquid in the conduit 60, such that the compressor 40 may operate with enhanced capacity (e.g., reduce wear caused by liquid in the compressor 40 and/or reduce power consumption by removing liquid that reduces compressor performance).

At block 104, the control system 62 (e.g., the processor 68) may utilize the one or more indications received from the sensor 64 to detect a presence of liquid in the conduit 60. For example, the sensor 64 may provide an indication to the control system 62 of an amount of power consumed by the tip portion 70 (e.g., heating element) of the sensor 62 over time and/or a temperature differential in the tip portion 70. Accordingly, the control system 62 (e.g., the processor 68) may utilize such data to determine a presence of liquid (e.g., a quantitative value or a qualitative indication of the presence of liquid) in the conduit 60 using algorithms stored in the memory 66 of the control system 62.

At block 106, the control system 62 (e.g., the processor 68) may be configured to compare the presence of liquid in the conduit 60 determined using the indications from the sensor 64 to a predetermined threshold (e.g., a threshold value and/or a predetermined response received from the sensor 64) stored in the memory 66. For example, the predetermined threshold may be an amount of liquid that may reduce an efficiency of the compressor 40 beyond a predetermined limit (e.g., a limit specified by an original equipment manufacturer or supplier). In other embodiments, the predetermined threshold may be a qualitative indication of an amount of liquid that may reduce the efficiency of the compressor 40 beyond a predetermined limit. For example, the predetermined threshold may include a predetermined response (e.g., power supplied to the tip portion 70 of the sensor 64) received from the sensor 64 indicative of the presence of liquid. The predetermined response may be a spike in the amount of power supplied to the tip portion 70 (e.g., the heating element) or a significant fluctuation in the amount of power supplied to the tip portion 70.

At block 108, when the liquid present in the conduit 60 exceeds the predetermined threshold, the control system 62 may adjust one or more operating parameters of the vapor compression refrigeration cycle 42. For example, the control system 62 may be configured to send one or more signals to the compressor 40, the evaporator 48, the condenser 50, and/or the capacity control device 80 to adjust an operating parameter of the compressor 40 (e.g., a speed of the compressor via the prime mover 84), the evaporator 48 (e.g., a flow rate of the heat transfer medium 90 or the heat transfer fluid), and/or the condenser 50 (e.g., a flow rate of the cooling fluid 92 or heat transfer fluid), such that the liquid present in the conduit 60 is reduced. Additionally or alternatively, the control system 62 may be configured to send a signal to the indicator 86 to signal to an operator that the liquid present in the conduit 60 exceeds the threshold. Accordingly, the operator may adjust a valve and/or other control device to reduce the liquid present in the conduit 60.

One or more of the disclosed embodiments, alone or in combination, may provide one or more technical effects useful in enhancing detection of liquid in a conduit. In general, embodiments of the present disclosure include an enhanced liquid detection system 46 that may include a sensor 64 (e.g., a thermal flow sensor) electrically coupled to a control system 62. The sensor 64 may send a signal to the control system 62 related to a presence of liquid in a conduit 60. The control system 62 may determine a presence of liquid in the conduit 60 and send one or more signals to components of the system 42 to adjust one or more operating parameters, such that the liquid present in the conduit 60 is reduced. The technical effects and technical problems in the specification are exemplary and are not limiting. It should be noted that the embodiments described in the specification may have other technical effects and can solve other technical problems.

While only certain features and embodiments of the present disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out an embodiment, or those unrelated to enabling the claimed embodiments). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A liquid detection system, comprising:
a sensor disposed in a conduit on a suction side of a compressor, wherein the conduit is configured to convey a fluid; and
a controller communicatively coupled to the sensor, wherein the controller comprises a processor and a memory, wherein the memory comprises instructions to be executed by the processor, and wherein the controller is configured to:
receive one or more indications from the sensor of an amount of power consumed by an active sensor component;
determine a presence of liquid in the fluid based at least on the one or more indications; and
control a capacity control device of the compressor based on the presence of liquid in the fluid.

2. The liquid detection system of claim 1, wherein the sensor is a thermal flow sensor.

3. The liquid detection system of claim 2, wherein a tip portion of the thermal flow sensor comprises the active sensor component, and wherein the active sensor component comprises a heating element.

4. The liquid detection system of claim 3, wherein the thermal flow sensor is configured to monitor the amount of power consumed by the heating element to maintain a temperature set point.

5. The liquid detection system of claim 1, wherein the controller is configured to control the capacity control device based on the presence of liquid in the fluid, such that the presence of liquid in the fluid is reduced.

6. The liquid detection system of claim 1, wherein the capacity control device comprises inlet guide vanes of the compressor, wherein the inlet guide vanes are configured to adjust a flow of the fluid through the compressor.

7. The liquid detection system of claim 6, wherein the controller is configured to adjust an actuator of the capacity control device to reduce the flow of the fluid through the compressor when the presence of liquid in the fluid exceeds a threshold.

8. The liquid detection system of claim 1, wherein the controller is configured to control the capacity control device based on the presence of liquid in the fluid when the presence of liquid in the fluid exceeds a threshold.

9. The liquid detection system of claim 1, wherein the presence of liquid in the fluid is a quantitative value of an amount of liquid, a qualitative indication of liquid, or a combination thereof.

10. The liquid detection system of claim 1, wherein the controller is configured to actuate an indicator when the presence of liquid in the fluid exceeds a threshold.

11. The liquid detection system of claim 10, wherein the indicator comprises a light emitting diode that illuminates when the presence of liquid in the fluid exceeds the threshold.

12. A refrigeration system, comprising: a heat exchanger configured to establish a heat exchange relationship between a refrigerant and a heat transfer fluid; a compressor configured to circulate the refrigerant; a sensor disposed in a conduit downstream of the heat exchanger and upstream of the compressor; and a controller communicatively coupled to the sensor, wherein the controller comprises a processor and a memory, wherein the memory comprises instructions to be executed by the processor, and wherein the controller is configured to: receive one or more indications from the sensor of an amount of power consumed by a heating element of the sensor; determine a presence of liquid in the conduit based at least on the one or more indications; and adjust a flow of the heat transfer fluid through the heat exchanger based on the presence of liquid in the conduit.

13. The refrigeration system of claim 12, wherein the sensor comprises a thermal flow sensor, wherein a tip portion of the thermal flow sensor comprises the active sensor component, wherein the active sensor component comprises a heating element, and wherein the thermal flow sensor is configured to monitor the amount of power consumed by the heating element to maintain a temperature set point.

14. The refrigeration system of claim 12, wherein the heat exchanger is an evaporator disposed upstream of the compressor and is configured to transfer heat from the heat transfer fluid to the refrigerant, and wherein the controller is configured to increase the flow of the heat transfer fluid through the evaporator based on the presence of liquid in the conduit.

15. The refrigeration system of claim 12, wherein the heat exchanger is a condenser disposed downstream of the compressor and is configured to transfer heat from the refrigerant to the heat transfer fluid and wherein the controller is configured to decrease the flow of the heat transfer fluid to the condenser based on the presence of liquid in the conduit.

16. A method, comprising: receiving feedback from a sensor disposed in a conduit on a suction side of a compressor of a liquid detection system, wherein the conduit is configured to convey a fluid to the compressor, and wherein the feedback is indicative of an amount of power consumed by a heating element of the sensor; determining a presence of liquid in the conduit based at least on the feedback; comparing the presence of liquid in the conduit to a threshold value; and adjusting an operating parameter of the compressor based at least on the presence of liquid in the conduit when the presence of liquid in the conduit exceeds the threshold value.

17. The method of claim 16, comprising monitoring the amount of power consumed by the heating element of the sensor.

18. The method of claim 16, wherein adjusting the operating parameter of the compressor based at least on the presence of liquid in the conduit when the presence of liquid in the conduit exceeds the threshold value comprises adjusting inlet guide vanes of the compressor to adjust a flow of the fluid through the compressor.

19. The method of claim 18, wherein adjusting the inlet guide vanes of the compressor comprises closing the inlet guide vanes of the compressor, such that the flow of the fluid through the conduit is reduced.

\* \* \* \* \*